United States Patent
Dunmire

(10) Patent No.: US 6,250,862 B1
(45) Date of Patent: Jun. 26, 2001

(54) BOXCAR TIEDOWN SYSTEM USING ANGLED WARP SPIKES

(75) Inventor: Daniel F. Dunmire, Stony Brook, NY (US)

(73) Assignee: Davis Aircraft Products Co., Inc, Bohemia, NY (US)

( * ) Notice: Subject to any disclaimer, the term of this patent is extended or adjusted under 35 U.S.C. 154(b) by 0 days.

(21) Appl. No.: 09/288,249

(22) Filed: Apr. 8, 1999

(51) Int. Cl.⁷ .................................................... B60P 7/08
(52) U.S. Cl. ........................ 410/106; 410/101; 411/923; 411/922; 411/478
(58) Field of Search ............................. 410/94, 101, 106, 410/102, 116, 121; 105/355; 249/499; 24/265 CD, 115 K; 411/447, 448, 462, 478, 922, 923

(56) References Cited

U.S. PATENT DOCUMENTS

| | | | |
|---|---|---|---|
| 141,810 | * | 8/1873 | Nichols .................................. 411/478 |
| 2,461,767 | * | 2/1949 | Peyton .................................. 410/121 |
| 2,548,993 | * | 4/1951 | Mierzwa ............................... 410/101 |
| 2,598,068 | * | 5/1952 | Peyton ............................. 410/121 X |
| 2,627,637 | * | 2/1953 | Downing ............................... 410/101 |
| 2,786,428 | * | 3/1957 | Arnold .................................. 410/102 |
| 2,812,728 | * | 11/1957 | Reheis ................................... 410/121 |
| 4,167,885 | * | 9/1979 | Paskert et al. ........................ 411/478 |
| 4,217,831 | * | 8/1980 | Koliba et al. ......................... 410/121 |
| 4,338,053 | * | 7/1982 | Abel ....................................... 410/94 |
| 4,650,382 | * | 3/1987 | Johnson ........................... 410/116 X |
| 4,695,211 | * | 9/1987 | Van Iperen et al. ................... 410/77 |
| 4,842,460 | * | 6/1989 | Schlesch .............................. 410/121 |
| 4,955,771 | * | 9/1990 | Bott ........................................ 410/94 |
| 5,547,321 | * | 8/1996 | Thomas ................................ 410/102 |

* cited by examiner

Primary Examiner—Stephen T. Gordon
(74) Attorney, Agent, or Firm—Kenneth P. Robinson

(57) ABSTRACT

Angled warp spikes enable secure attachment to the steel flooring of a railroad boxcar. Such flooring includes transverse slots with a curved depth profile. The warp spikes are designed to deform or warp as they are driven into a flooring slot and conform to the curved depth profile. Tiedown fixtures fabricated of steel plate can be attached to the floor of a boxcar by warp spikes driven through elongated openings in the fixture into slots in the boxcar flooring. Tiedown fixtures used with warp spikes provide a boxcar tiedown system to which tiedown load carrying members, such as cables, chains, braces and struts can be connected.

13 Claims, 2 Drawing Sheets

BOXCAR TIEDOWN SYSTEM USING ANGLED WARP SPIKES

RELATED APPLICATIONS (Not Applicable)

FEDERALLY SPONSORED RESEARCH (Not Applicable)

BACKGROUND OF THE INVENTION

This invention relates to arrangements for positioning articles and containers and, more particularly, to devices and systems for effective tiedown of articles and containers within railroad boxcars during shipment.

Articles shipped by railroad boxcar are subjected to forces tending to cause displacement of such articles within the boxcar. Such forces arise during transit and particularly when boxcars are bumped together during assembly of a train of boxcars.

Severe damage can result if heavy articles are displaced by such forces. To avoid damage, tiedown systems and other arrangements have been proposed and employed. Typically, such arrangements have been subject to one or more shortcomings, such as excessive cost, difficulty of practical use and reuse, ineffectiveness or limited capacity. Shortcomings of prior systems have been exacerbated in the environment of railroad boxcars. Boxcars are typically characterized by a slotted steel floor, to which it is difficult to make firm connection, and wooden sides, which are not structurally adequate for connection of tiedown members to restrain large heavy articles. Thus, for example, while a boxcar is capable of transporting large rolls of newsprint weighing several tons, there are typically inadequate facilities within the boxcar to permit secure connection of prior tiedown restraining devices.

Objects of the invention, therefore, are to provide new and improved tiedown systems and devices, and such systems and devices having one or more of the following characteristics and capabilities:

secure attachment to a boxcar floor;

ease of installation and removal;

economical construction;

reliable capacity and performance;

strong, simple fixtures for floor attachment;

simple warp spikes for fixture attachment to slotted flooring; and fixtures with reliable attachment points for tiedown tension members.

SUMMARY OF THE INVENTION

In accordance with the invention, an angled warp spike, suitable for insertion into a curved slot having a transverse width and a curved depth profile, comprises a deformable unit having a striking head remote from an insertion tip, a thickness less than the transverse slot width and a breadth greater than the transverse width. The warp spike includes a shoulder portion adjacent the striking head and having a greater breadth than the portion of the unit between the shoulder portion and the insertion tip. A bend extends longitudinally between the striking head and the insertion tip. The warp spike is formed of deformable material to enable it to warp to conform to the dimensions of a curved slot when inserted therein.

Also in accordance with the invention, a boxcar tiedown fixture, attachable to a floor having spaced slots, includes a floor plate of dimensions adequate to extend across a plurality of such spaced slots. The floor plate has a plurality of elongated openings arranged to enable a plurality of the openings to be positioned above at least one of the spaced slots of the floor. The tiedown fixture also includes a connection portion extending perpendicularly from the floor plate and configured to enable connection of a tiedown load carrying member, such as a chain, cable, rope, hook, brace or strut. The tiedown fixture is thus arranged to be attached to the boxcar floor by insertion of fastening devices through the elongated openings into at least one of the spaced slots in the boxcar flooring.

Pursuant to the invention, a boxcar tiedown system includes a boxcar tiedown fixture, as described above, in combination with a plurality of angled warp spikes, as described above. Thus, the warp spikes are configured to be driven into slots in the boxcar flooring, via the elongated openings, to attach the tiedown fixture to the boxcar floor to permit connection of chains, struts or other load carrying members for tiedown purposes.

For a better understanding of the invention, together with other and further objects, reference is made to the accompanying drawings and the scope of the invention will be pointed out in the accompanying claims.

DESCRIPTION OF THE INVENTION

Figure 1:
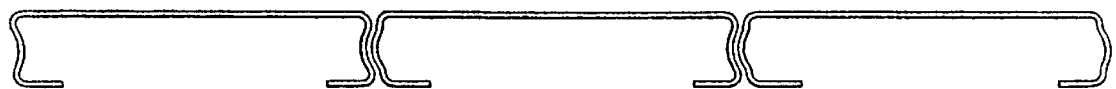
FIG. 1 is a cross-sectional view of a portion of the steel flooring of a railroad boxcar, showing the cross-sectional profile of slots which run across the car and have a curved depth profile.

For reference purposes, FIG. 1 is a cross-sectional representation of slotted boxcar flooring constructed of steel. Boxcar length runs right and left in the FIG. 1 representation. The flooring has slots which run straight across the width of a boxcar, but are curved in the vertical direction. Thus, the flooring has curved slots each having a transverse width across the slot (perpendicular to boxcar width) and a curved depth profile (as visible in FIG. 1).

Figures 2, 3:
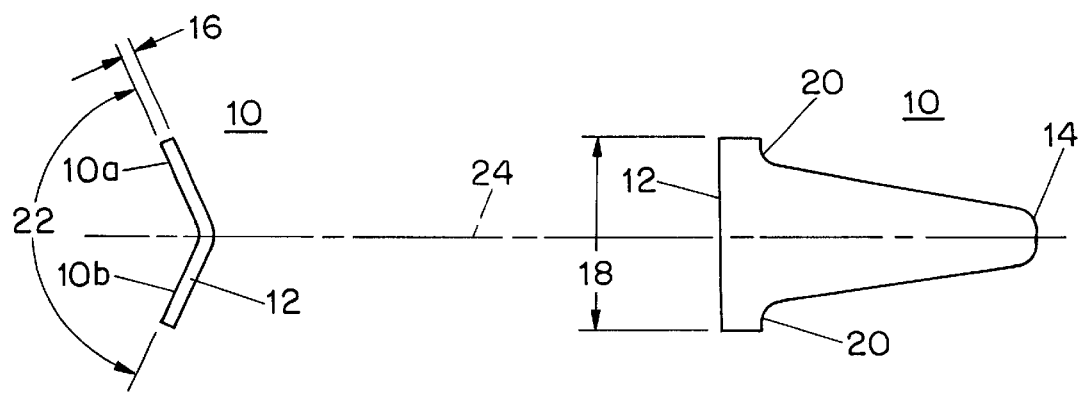
FIGS. 2 and 3 are respectively top and front views of an angled warp spike in accordance with the invention.

FIGS. 2 and 3 are respectively top and front views of an angled warp spike 10 in accordance with the invention. As shown, the warp spike is a deformable unit having a striking head 12 remote from an insertion tip 14. Spike 10 has a thickness 16, which is less than the transverse width of the slots in the boxcar flooring, and a breadth 18, which is greater than such transverse width of the floor slots in a boxcar in which the spike is to be used. The warp spike of FIGS. 2 and 3 includes a shoulder portion 20 which protrudes on each side. As shown, the shoulder portion is adjacent (i.e., spaced by a small fraction of spike length) to striking head 12. The shoulder portion is of greater breadth 18 than the portion of the spike between the shoulder portion and the insertion tip 14. In this embodiment the shoulder portion is the same breadth as the striking head and spike breadth decreases from shoulder portion to insertion tip.

As visible in FIG. 2, the warp spike includes a bend, which extends longitudinally between striking head 12 and insertion tip 14. The bend, represented by angle 22 in FIG. 2, is transverse to and extends along a bend line represented at 24 in FIG. 3, which extends from the striking head 12 to the insertion tip 14. In FIG. 2, it will be seen that the side portions 10a and 10b on either side of the bend line 24 are at an obtuse angle relative to each other (i.e., an angle of 135 degrees in this example). It will further be seen that the bend is implemented by inclusion of a central radially curved portion at the juncture of side portions 10a and 10b in FIG. 2. The radius of curvature may be selected as appropriate to particular embodiments and applications of the invention.

A typical warp spike pursuant to the invention may have a length of about 2 inches, a breadth 18 of about 1⅓ inches, and be formed of a portion of steel plate (4130 steel, 0.090 inch thick, for example). Warp spikes may be "soft" (no heat treating) or "hard" (heat treated). Generally, soft spikes are easier to insert into a boxcar floor slot and less resistant to displacement or removal, and hard spikes are more difficult to insert and more resistant to displacement or removal. However, soft spikes have been found to be quite resistant to displacement or removal relative to nails and other prior devices. Suitable gauge aluminum, 1018 steel or other material may be used as alternatives to 4130 steel.

The warp spike is formed of material which is deformable without fracture, to enable it to deform or warp when driven into a boxcar floor, to thereby conform to the dimensions of the curved floor slot. For insertion, the insertion tip can be introduced into a slot and the spike driven in by being struck on the striking head by a hammer, mallet or small sledge hammer. It will be appreciated that the resulting deformation may include both deformation of the bend 22, as the bent cross-section of the spike exceeds transverse slot width, and longitudinal deformation, as the spike encounters the curved depth profile of the boxcar floor slot.

With an understanding of the invention, it will be appreciated that with the construction as illustrated, or appropriate modifications thereof, skilled persons will be enabled to provide warp spikes for a variety of applications in addition to the boxcar application as described.

Figure 4:
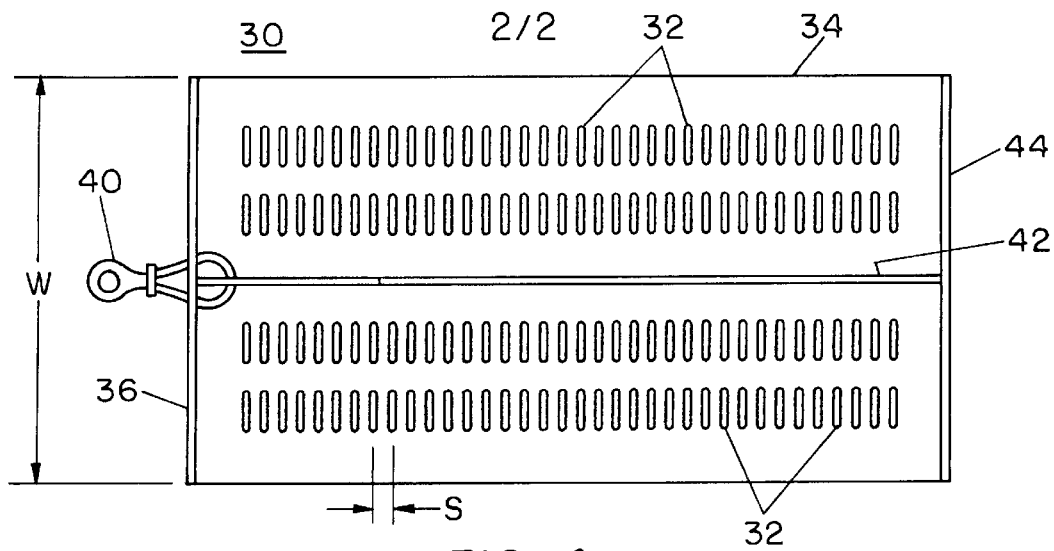
FIGS. 4, 5 and 6 are respectively plan, end and side views of a tiedown fixture for use in a boxcar in accordance with the invention.
Figure 5:
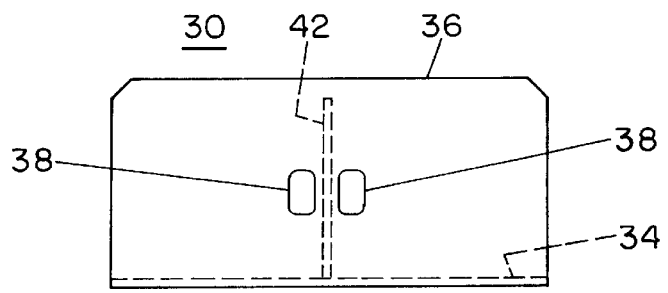
Figure 6:
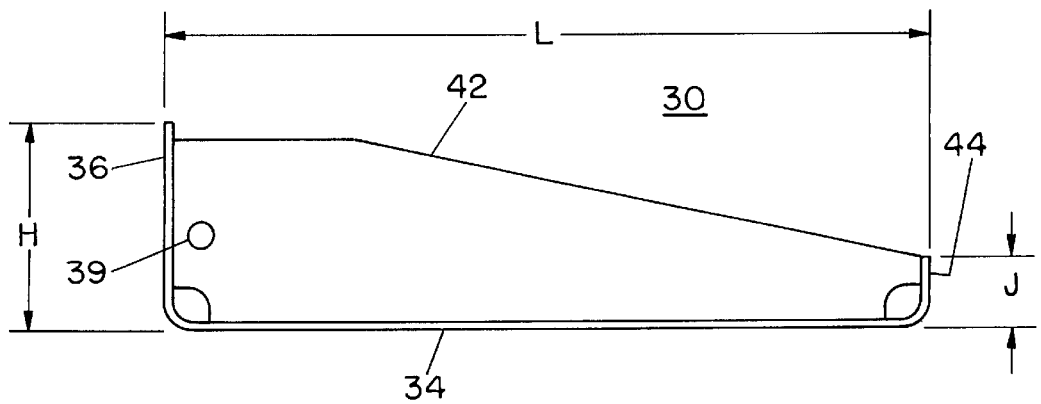

Reference is now made to FIGS. 4, 5 and 6, which are respectively plan, end and side views of boxcar tiedown fixture 30 pursuant to the invention. Fixture 30 is designed to be attachable to the slotted floor of a boxcar by having warp spikes driven through elongated openings 32 in fixture 30, into spaced slots in the boxcar flooring. Such flooring is illustrated in FIG. 1.

Tiedown fixture 30, as shown in FIG. 4, includes a floor plate 34 of dimensions adequate to extend across a plurality of the spaced slots in the floor of a boxcar. As illustrated, floor plate 34 comprises a rectangle with a width W of about 12 inches and length L of about 21 inches, cut from 0.188 inch thick steel plate stock. Fixture 30 includes a plurality of elongated openings 32 arranged in a pattern with lateral spacing S of about 0.5 inch to enable a plurality of the openings 32 to be positioned above at least one of the spaced slots in the flooring. Desirably, the pattern of openings 32 is such as to provide a plurality of positions (four positions, for example) at which an elongated opening may be aligned with a floor slot.

As shown more particularly in FIGS. 5 and 6, tiedown fixture 30 also includes a connection portion 36 extending from floor plate 34. Connection portion 36 is configured to enable connection of a tiedown load carrying member, such as a chain, cable, rope, hook, brace, strut, etc. In this embodiment, connection portion 36 includes two side-by-side openings 38 suitable for insertion of a structural eye type device 40 enabling connection of such a tiedown tension member. As shown particularly in the side view of FIG. 6, connection portion 36 may comprise an end portion of floor plate 34, which has been bent up to a position nominally perpendicular to the main portion of floor plate 34. In fabricating the tiedown fixture, connection portion 36 may have a height H of about 6 inches and be bent up to a desired angular relation with a radial bend at the junction of portion 36 and the main floor plate portion 34, as in FIG. 6. In other embodiments, connection portion 36 may be welded or otherwise fastened to floor plate 34.

With particular reference to FIG. 6, the illustrated tiedown fixture includes a brace member 42 fixed to both the main floor plate portion 34 and the connection portion 36. As shown in FIG. 6, an opening 39 is provided for use with openings 38 to permit insertion of an eye type device. Brace member 42 may be a portion of steel plate stock positioned perpendicular to each of floor plate 34 and connection portion 36 and welded in place to form a structural unit. With this construction, brace member 42 is effective to limit deformation of connection portion 36 when it is subjected to loading forces. Such loading forces include tension forces applied via a tiedown tension member (e.g., chain or cable) connected to openings 38 (e.g., via an eye device 40) or compressive forces applied via a tiedown compression member (e.g., brace or strut) connected to openings 38. For various reasons, it may be desirable that elements of the tiedown fixture not be exactly perpendicular. For this purpose, "nominally perpendicular" is defined as within plus or minus 15 degrees of perpendicular. As seen in FIG. 6, fabrication details may include bending up the end portion 44 of floor plate 34 which is remote from the connection portion 36 to a height J of about 2 inches. The brace member 42 is then fitted between the vertical end portions 36 and 44. The radial bends at the ends of floor plate 34, as shown, may also be used to facilitate floor plate removal by providing crowbar pry-up access points. With an understanding of the invention, a variety of other materials and geometries may be utilized.

A boxcar tiedown system is provided by use of warp spikes 10 in combination with a tiedown fixture 30, pursuant to the invention. Tiedown fixture 30 is placed at a desired position on the floor of a boxcar. A plurality of warp spikes 10 are then driven through selected ones of the elongated openings 32 and into slots in the boxcar flooring. For this purpose, it is desirable that the elongated openings 32 have an end-to-end length smaller than the breadth 18 of the shoulder portion of the warp spikes. The shoulder portions of a warp spike thus come in contact with the upper surface of floor plate 34 as the spike is driven through an elongated opening 32, to hold the fixture 30 in fixed position. It is also desirable that the elongated openings have a transverse width adequate to enable insertion of the warp spike without significant deformation thereof. It will be appreciated that in addition to enabling connection of load carrying members to fix an article in place within a boxcar, a tiedown system as described can be positioned immediately adjacent to an article or container to directly restrain its movement.

In tests, a tiedown fixture 30 as illustrated was attached to a boxcar slotted floor section by use of warp spikes 10 as illustrated. With use of four soft (not heat treated) warp spikes the tiedown fixture sustained an ultimate tension test loading in excess of the ultimate tension test loading sustained with use of 8 common nails of 8d weight. Heat treated warp spikes required more effort to drive into place and, when in place, sustained substantially higher ultimate tension loading than recorded with use of a like number of soft spikes. The curved depth profile of the boxcar flooring as shown in FIG. 1, results in a tiedown fixture/warp spikes combination capable of sustaining substantially higher ultimate loading when the direction of force is toward the concave aspect of the curved depth profile of the boxcar floor slots (i.e., to the left in FIG. 1), as compared to the ultimate loading sustainable with the force in the opposite direction (toward the convex aspect of the floor slots). Also, as expected, higher ultimate tension loading was sustainable with pulling force along a direction parallel to the boxcar floor surface, then with a pulling force acting at a 30 degree angle to the surface of the boxcar flooring. However, in each case, the sustainable tension test loading with use of four soft warp spikes was greater than with 8 nails of 8d weight and much greater than with 4 nails of 8d weight.

While there have been described the currently preferred embodiments of the invention, those skilled in the art will recognize that other and further modifications may be made without departing from the invention and it is intended to claim all modifications and variations as fall within the scope of the invention.

What is claimed is:

1. A boxcar tiedown system, attachable to a floor having a plurality of curved slots having a transverse width and a curved depth profile, said system including:

(A) a tiedown fixture comprising:

a floor plate of dimensions adequate to extend across a plurality of said curved slots, said floor plate having a plurality of elongated openings arranged to enable a plurality of said openings to be positioned above at least one of said curved slots; and a connection portion extending from said floor plate and configured to enable connection of a tiedown load carrying member; and (B) at least one angled warp spike comprising:

a deformable unit having a striking head remote from an insertion tip, a thickness less than said transverse width and a breadth greater than said transverse width;

a shoulder portion adjacent said striking head, said shoulder portion of greater breadth than the portion of said unit between the shoulder portion and said insertion tip; and a bend extending longitudinally between said striking head and said insertion tip; said warp spike formed of deformable material to enable it to warp to conform to the dimensions of a curved slot when driven through one of said elongated openings of said tiedown fixture into a curved slot of said floor to attach said tiedown fixture to said floor.

2. A tiedown system as in claim 1, wherein said elongated openings have a transverse width adequate to enable insertion of said warp spike without deformation thereof.

3. A tiedown system as in claim 1, wherein said elongated openings have an end-to-end length smaller than the breadth of the shoulder portion of said warp spikes.

4. A tiedown system as in claim 1, wherein said floor plate includes a pattern of said elongated openings to permit a plurality of warp spikes to be driven through said floor plate into curved slots in said floor.

5. A tiedown system as in claim 1, wherein said connection portion comprises a portion of said floor plate bent up to position nominally perpendicular to a main portion of said floor plate, and including at least one opening for attachment of a tiedown load carrying member to said connection portion.

6. An angled warp spike in combination with a curved slot:

the curved slot comprising a slot having a transverse width and a curved depth profile; and the angled warp spike comprising:

a deformable unit having a striking head remote from an insertion tip, a thickness less than said transverse width and a breadth greater than said transverse width;

a shoulder portion adjacent said striking head, said shoulder portion of greater breadth than the portion of said unit between the shoulder portion and said insertion tip; and a bend extending longitudinally between said striking head and said insertion tip;

said warp spike formed of deformable material to enable it to warp to conform to the dimensions of said curved slot when inserted therein.

7. An angled warp spike in combination with a curved slot as in claim 6, wherein said member is a structural element and said curved depth profile extends into the structural element from a surface thereof.

8. An angled warp spike in combination with a curved slot as in claim 6, wherein said striking head includes a flattened strike surface and said insertion tip is narrow relative to the breadth of the striking head.

9. An angled warp spike in combination with a curved slot as in claim 6, wherein said shoulder portion has substantially the same breadth as said striking head and the warp spike decreases in breadth from the shoulder portion to the insertion tip.

10. An angled warp spike in combination with a curved slot as in claim 6, wherein said bend is transverse to and extends along a bend line between the striking head and the insertion tip.

11. An angled warp spike in combination with a curved slot as in claim 10, wherein side portions of said warp spike on either side of said bend line are at an obtuse angle relative to each other.

12. An angled warp spike in combination with a curved slot as in claim 10, wherein said bend includes a radially curved portion of said warp spike lying long said bend line.

13. An angled warp spike in combination with a curved slot as in claim 12, wherein the warp spike includes side portions extending laterally beyond said radially curved portion, and said side portions are at an obtuse angle of approximately 135 degrees relative to each other.

\* \* \* \* \*